Nov. 3, 1942.                W. G. SLEIGHTER                    2,300,983
                               FLOPOVER BOX
                            Filed Aug. 27, 1940
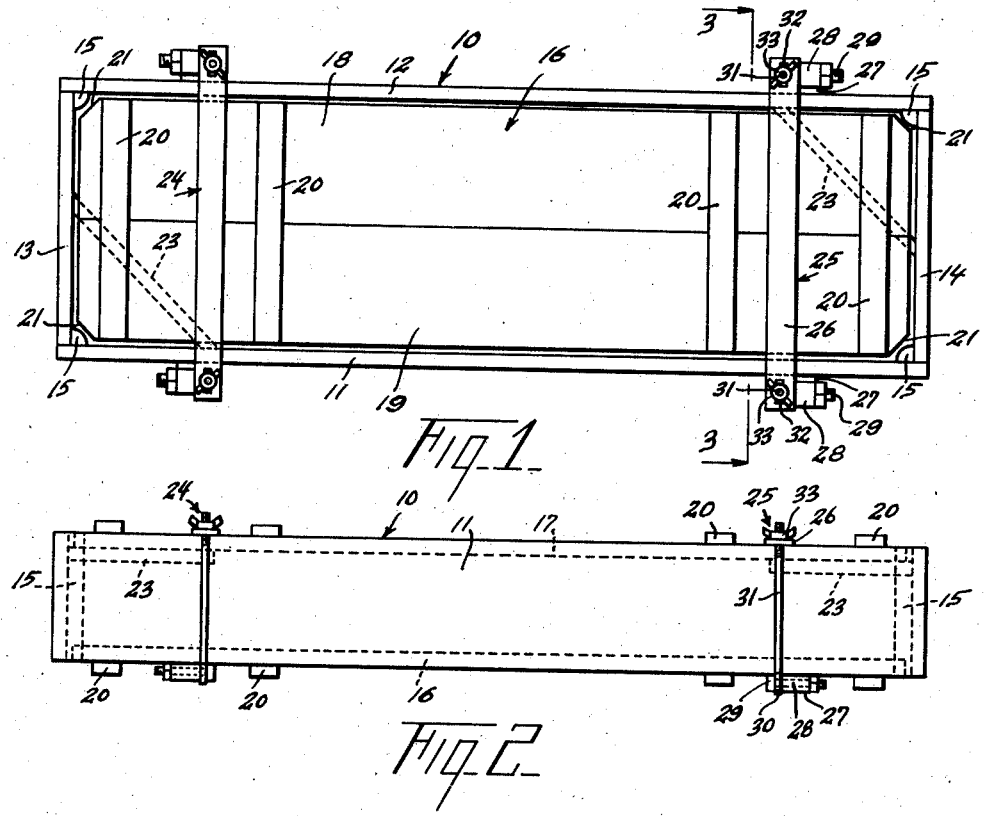
Fig. 1
Fig. 2
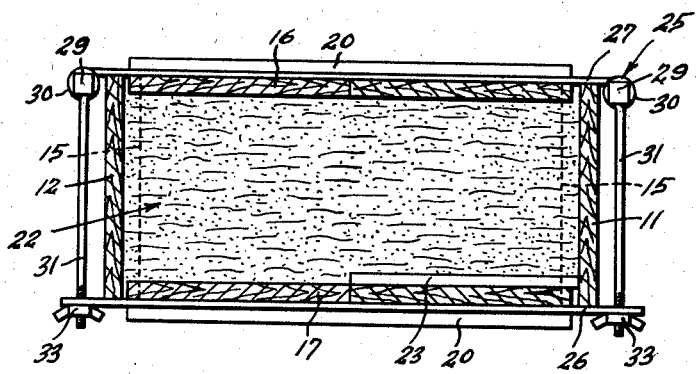
Fig. 3
William G. Sleighter
INVENTOR
BY Carl Miller
ATTORNEY

UNITED STATES PATENT OFFICE 2,300,983

FLOP-OVER BOX

William G. Sleighter, Youngwood, Pa.

Application August 27, 1940, Serial No. 354,377

1 Claim. (Cl. 217—5)

This invention relates to receptacles for confining mushroom spawn and the like during the period of development in which the specially prepared mold or soil is confined in a receptacle, and has for its object to render the process more expeditious, and more productive at lessened cost.

When a normal, good bed of compost is being cleaned out, it will be observed that the last two inches of manure in the bottom of the bed still has a considerable amount of mossy gray mycelium present, which apparently has not given up its stored food to produce mushrooms. It is accordingly the principal object of this invention to provide a receptacle containing the bed that will permit the turning over of the bed so as to utilize the spawn in these last few inches of the bed without destroying the spawn. Heretofore, mushroom growers have used a shovel to "flop" or turn over the compost in the beds. This method requires hard labor and skill, breaks up the compost, destroying a considerable amount of the spawn. The use of a flop-over receptacle as contemplated by the invention will not disturb the compost as the same is flopped over, and will result in the mushrooms coming into bearing quicker, with less labor, and will produce a much larger yield.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a bottom plan view of the flop-over box.

Figure 2 is an elevational view of the box with the bottom uppermost.

Figure 3 is a transverse sectional view through the box in normal position (with bottom cover at the bottom).

Referring to the drawing in detail, 10 denotes the receptacle which will hereinafter be referred to as a flop-over box, and comprises an elongated rectangular box-like structure preferably made of suitable wood planking and open at its top and bottom. The box 10 is formed to provide side-walls 11 and 12, and end walls 13 and 14 suitably joined together in any desired manner. To increase the rigidity of the box 10, there is provided in each of the corners thereof, a corner brace 15 formed of quarter-round stock which extends the full width of the side and end walls with the ends thereof lying flush with the edges of said walls, and each being rigidly secured in any desired manner to adjacent side and end walls.

Adapted for placement in each of the bottom and top openings of the box 10 is respectively, a bottom cover 16 and a top cover 17, both being substantially identical and interchangeable. Each cover is formed of a pair of planks 18 and 19 arranged in side by side abutting relation, and suitably joined together in any desired manner. To insure rigidity of each cover and to prevent warping thereof there is provided on the outer surface of each cover a plurality of cross braces 20 fastened in any suitable manner to the planks 18 and 19. The cross-braces 20 extend the full width of the cover and may be either of wood or metal. While any desired number of cross-braces 20 may be utilized, the outermost cross-braces 20 should be positioned closely adjacent the transverse ends of said covers. In order to permit the insertion of the bottom and top covers 16 and 17 into their respective openings, the corners thereof are preferably beveled as at 21 so as to clear the quarter-round corner braces 15. Preferably the length and width of each cover is made slightly less than the corresponding inside dimensions of the box 10, as clearly shown in Fig. 1, so as to permit the covers to fit inside of the box 10, as sometimes the compost therein varies in thickness.

In use, either the bottom cover 16 or the top cover 17 is in position with reference to the bottom opening of the box 10 which is filled with the compost 22. Diagonal braces 23 arranged one at each end of the box 10 are positioned adjacent the bottom edges of the box 10 in the bottom opening so as to provide abutments for the bottom cover 16. When it is desired to flop-over the box 10 for the purpose as hereinabove described, the top opening is closed by a cover, which along with the bottom cover is clamped to the box 10 by the clamps 24 and 25, thereby permitting the box 10 to be turned over.

The clamps 24 and 25 are identical, hence a detailed description of one will suffice. Thus, each clamp comprises an upper metallic strap 26 and a lower metallic strap 27 having a length greater than the transverse width of the box 10. The lower strap 27 is formed with an eye 28 at each end thereof so as to be disposed outwardly of the sides of the box 10. Extending through each eye 28 is a bolt 29 which serves to pivotally or hingedly connect to said eye, the eye 30 of an eye-bolt 31. The upper strap 26 is provided at each end with a slot 32 through which the threaded end of the eye-bolt 31 is adapted to extend and which is provided with a wing-nut 33 for seating engagement on the outer surface of the upper strap 26. Turning of the wing-nuts 33 on the eye-bolts 31 will act to clamp the upper and lower straps 26 and 27 in place to thereby retain the covers 16 and 17 in position to permit a flopping over of the box 10 without disturbing the compost 22 therein. In view of the hinge connection of the eye-bolts 31 to the ends of the lower strap 27, the latter may readily be positioned in place beneath the bottom cover 16. The upper strap 26 is then placed over the top cover 17 and the eye-bolts 31 moved up into the slots 32, and upon setting up on the wing-nuts 33 both covers are quickly clamped in position.

Having thus set forth and disclosed the nature of this invention, what is claimed is:

A receptacle adapted to contain compost for mushroom growth comprising an elongated rectangular box open at its top and bottom ends, top and bottom covers providing closure means each adapted to respectively loosely fit bodily within said top and bottom ends, a pair of parallel brace means within said box and disposed in diagonally opposed relation to limit inward movement of one of said covers and to position the same such that the outer surface thereof will lie in the plane of the adjacent end edges of said box, a pair of parallel transverse cross-members fixed in the outer surface of each cover adjacent the ends thereof such as to space said cover and box from a supporting surface, and a separable clamping means arranged in surrounding relation to said box, one adjacent each end thereof and between the parallel cross-members of each pair for securing said top and bottom covers to said box to permit a turning over of said box without disturbing the compost therein, each said clamping means comprising a lower strap having an eye formed at each end thereof, said strap exceeding in length the width of said box, an eye-bolt at each end of said lower strap, bolt means hingedly connecting an eye-bolt to an eye of said lower strap, and said upper strap having a slot formed in each end thereof and of a length corresponding to that of said lower strap, said slots being adapted to receive the threaded ends of said eye-bolts, and a wing-nut on each threaded end arranged to have seating engagement on the outer surface of said upper strap.

WILLIAM G. SLEIGHTER.